United States Patent [19]

Hsu

[11] Patent Number: 5,907,604
[45] Date of Patent: *May 25, 1999

[54] IMAGE ICON ASSOCIATED WITH CALLER ID

[75] Inventor: P. Robert Hsu, San Jose, Calif.

[73] Assignees: Sony Corporation, Tokyo, Japan; Sony Electronics Inc., Park Ridge, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/823,939

[22] Filed: Mar. 25, 1997

[51] Int. Cl.$^6$ .............. H04M 7/14; H04M 1/56; H04M 15/06
[52] U.S. Cl. .............. 379/142; 379/201; 379/93.23; 348/14; 348/15
[58] Field of Search .............. 358/85; 379/90, 379/93.17, 202, 142, 201, 245, 247, 93.08, 88.17, 88.2, 88.21; 348/14, 18

[56] References Cited

U.S. PATENT DOCUMENTS

| | | | |
|---|---|---|---|
| H1714 | 3/1998 | Partrtidge | 379/93.01 |
| 4,338,492 | 7/1982 | Snopko | 358/85 |
| 4,356,509 | 10/1982 | Skerlos et al. | 358/85 |
| 4,456,925 | 6/1984 | Skerlos et al. | 358/85 |
| 4,979,028 | 12/1990 | Minematsu et al. | 358/85 |
| 5,012,328 | 4/1991 | Ishiguro | 358/22 |
| 5,073,926 | 12/1991 | Suzuki et al. | 379/53 |
| 5,073,927 | 12/1991 | Grube | 379/53 |
| 5,136,628 | 8/1992 | Araki et al. | 379/53 |
| 5,194,955 | 3/1993 | Yoneta et al. | 358/209 |
| 5,237,420 | 8/1993 | Hayashi | 358/188 |
| 5,272,526 | 12/1993 | Yoneta et al. | 358/85 |
| 5,293,232 | 3/1994 | Seki et al. | 358/715 |
| 5,327,486 | 7/1994 | Wolff et al. | 379/96 |
| 5,363,203 | 11/1994 | Tahara et al. | 358/403 |
| 5,420,636 | 5/1995 | Kojima | 348/403 |
| 5,420,641 | 5/1995 | Tsuchida | 348/556 |
| 5,442,686 | 8/1995 | Wada et al. | 379/88 |
| 5,546,447 | 8/1996 | Skarbo et al. | 379/142 |
| 5,559,868 | 9/1996 | Blonder | 379/96 |
| 5,657,246 | 8/1997 | Hogan et al. | 348/515 |
| 5,696,815 | 12/1997 | Smyk | 379/142 |
| 5,754,636 | 5/1998 | Bayless et al. | 379/142 |
| 5,761,279 | 6/1998 | Bierman et al. | 379/142 |
| 5,805,677 | 9/1998 | Ferry et al. | 379/142 |

FOREIGN PATENT DOCUMENTS

WO 93/01685  1/1993  European Pat. Off. .

OTHER PUBLICATIONS

Rochelle Q&A Caller ID FAQ, Sep. 9, 1996, Rochelle Communications, Inc., Austin, TX.

"CallAudit Awarded Product of the Year 1995," Aug. 8, 1996.

*Primary Examiner*—Curtis A. Kuntz
*Assistant Examiner*—Rexford N. Barnie
*Attorney, Agent, or Firm*—Christopher M. Tobin; Jerry A. Miller

[57] ABSTRACT

A person receiving a telephone call to identifies a caller in advance of answering the telephone call by means of a image associated with the caller's Caller ID. The image is displayed on a telephone display device, television set, personal computer or other display coupled to the telephone system. The calling party may define the image to be associated with their Caller ID. The calling party transmits a image over the telephone line prior to, or concurrently with, a telephone call intended to be answered by the receiving party. The image is stored in a storage device coupled to the receiving party's telephone system along with an indication of the Caller ID of the calling party. The next time that the calling party calls the receiving party the previously stored image is accessed and displayed.

10 Claims, 7 Drawing Sheets

IMAGE ICON ASSOCIATED WITH CALLER ID

FIELD OF THE INVENTION

This invention relates in general to electronic image display and more specifically to the display of an image in association with a telephone system Caller ID.

BACKGROUND OF THE INVENTION

A relatively recent telephone service known as "Caller ID" allows a person who is receiving a telephone call to determine the calling party before the call is answered. This is done by having the calling telephone device transmit information, such as the phone number of the calling device, the name of the calling party, etc. The receiving telephone can use the information to determine whether to allow the call to go through, to block the call, or to display the information on a display at the receiving telephone.

Additional features provided by software created by third party manufacturers include announcing the Caller ID by voice synthesis so that the caller's name and/or number can be heard audibly by a person at the receiving telephone. This is useful, for example, where the receiving telephone does not have a visual display. Also, this is useful when the receiving party is not near their telephone so they cannot see the display.

A drawback with these Caller ID features is that it is difficult for a called party to remember who a caller is based on the Caller ID information. The calling party may not have provided a name so that the telephone number may be all that is available from the Caller ID. Even when a person's name is provided this may not be enough to jog the called party's memory into knowing who the caller is. This is especially true where the calling party is a company, or has some other commercial purpose as salesperson. In these cases the information provided by Caller ID may be obscure so as not to completely identify the calling party in a way that is helpful to the called party. In other words, the mere display of numbers and names is often a poor mnemonic to help with a called person's memory.

Another drawback with Caller ID is that the current Caller ID features do not integrate well with video services provided in connection with today's telephones. For example, video conferencing is becoming more popular, as is the general transmission of video or still picture images over the telephone line. When a participant is engaged in a video conference that participant may be viewing one or more images of people in the conference on a display device such as a large telephone display, personal computer or television. During the video conference a new caller may attempt to call into the participant. The display of the new caller's telephone number and name may be insufficient for the participant to identify the caller. Thus, the participant cannot make a good decision about whether to break from the video conference to answer the call. Also, the feature of having the incoming phone number and/or caller's name audibly announced would not work well in a video conferencing environment where the participant does not want to miss any of the video conferencing conversation.

Thus, it is desirable to provide the Caller ID service with additional features so that it is more useful to a user.

SUMMARY OF THE INVENTION

The present invention allows a person receiving a telephone call to identify a caller in advance of answering the telephone call. A image associated with the caller's Caller ID is used to indicate to the call recipient who the caller is. The image can be displayed on a telephone display device, television set, personal computer or other display coupled to the telephone system. The image can be, for example, the face of the caller. The image can also be of two or more family members associated with a particular telephone. Where a telephone call originates from a company or organization an image of that organization, such as a logo can be used. Also, fanciful or humorous images can be arbitrarily associated with Caller ID's to make the images more personal to the user's particular knowledge to assist in remembering the caller.

Another feature of the present invention is that the calling party may define the image to be associated with their Caller ID. The calling party transmits an image over the telephone line prior to, or concurrently with, a telephone call intended to be answered by the receiving party. The image is stored in a storage device coupled to the receiving party's telephone system along with an indication of the Caller ID of the calling party. The next time that the calling party calls the receiving party the previously stored image is accessed and displayed. Images can be sent in other ways such as by making them available on the Internet, mailing a diskette or CD ROM, etc.

One embodiment of the invention is a method for displaying an image in association with a Caller ID identifier. The method uses a telephone receiver, display device, processor, storage device and user input device. Steps in the method include using the processor to store an image in a storage medium; using the processor to store an association into the storage medium, wherein the association indicates that a predetermined Caller ID identifier and the image are associated; using the telephone receiver to receive an incoming call and an incoming Caller ID identifier; using the processor to determine that the incoming Caller ID identifier matches the predetermined Caller ID identifier; using the processor to display the image on the display device; accepting signals from the user input device; and selectively answering the incoming call in response to the signals from the user input device.

DETAILED DESCRIPTION OF A PREFERRED EMBODIMENT

Figure 1:
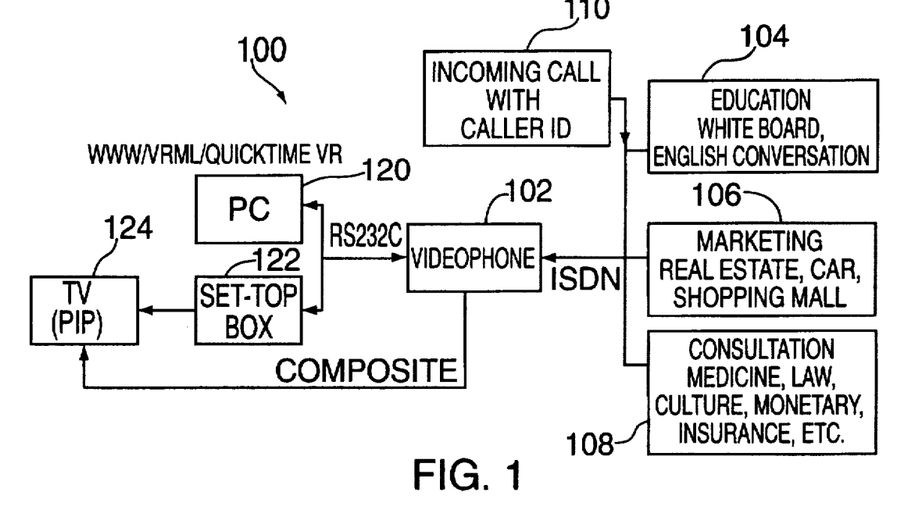
FIG. 1 shows a first configuration of the present invention.

FIG. 1 shows a system-level diagram 100 of a preferred embodiment of the present invention.

In FIG. 1 videophone 102 is a standard telephone instrument with picture receiving ability. In practice, videophone 102 may be any standard telephone instrument capable of receiving and decoding Caller ID information. However, a preferred embodiment uses the invention in connection with video conferencing in which case a videophone with image transfer capability is required. The embodiment conforms to ITU-T standards including H.320, H.323, H.324, T.120. Specifications for Caller ID can be found on the Internet at, e.g., http://www.epl.co.uk/showrm4.htm, or by using a search engine with the keywords "Caller ID specification" to obtain the latest versions of the specificaition.

Videophone 102 is connected to the worldwide telephone system by means of data or plain old telephone system (POTS) lines. If data lines are used typical types of data lines are POTS and Integrated Services Digital Newtork (ISDN). Each is capable of supporting concurrent voice and data transmission. The data lines are used to connect users of different videophones or other telecommunications equipment to videophone 102 for purposes of video conferencing. Other types of data lines may be used. In FIG. 1, system 100 is shown with typical connections for uses such as education, marketing and consultation. Participants in the video conference are represented by telephone instruments 104–108. Naturally, any number of video conferencing participants may be connected, up to the limits of the videophone system, and these participants can be in any part of the world where standard telephone service is provided. Telephone instrument 110 is yet another telephone instrument which, as discussed below, is used to place a call to the person at videophone 102 while a video conference is already in progress.

FIG. 1 shows videophone 102 connected to other devices such as personal computer (PC) 120, Set-Top Box 122 and television (TV) 124. A typical interconnection between videophone 102 and PC 120 and Set-Top Box 122 is by RS232C standard. The RS232C connection is used to transfer images, voice and other data between videophone 102, PC 120 and Set-Top Box 122. A composite video connection is used between videophone 102 and TV 124 to transfer composite video and audio information from videophone 102 to TV 124.

Other configurations are possible. For example, both PC 120 and the combination of TV 124 and Set-Top Box 122 need not be used. That is, the video conferencing capability can be provided by either PC 120 or the combination TV 124 and Set-Top Box 122. Alternatively, videophone 102 may provide its own graphics display so that a separate display device such as PC 120 or TV 124 is not necessary.

Figure 2:
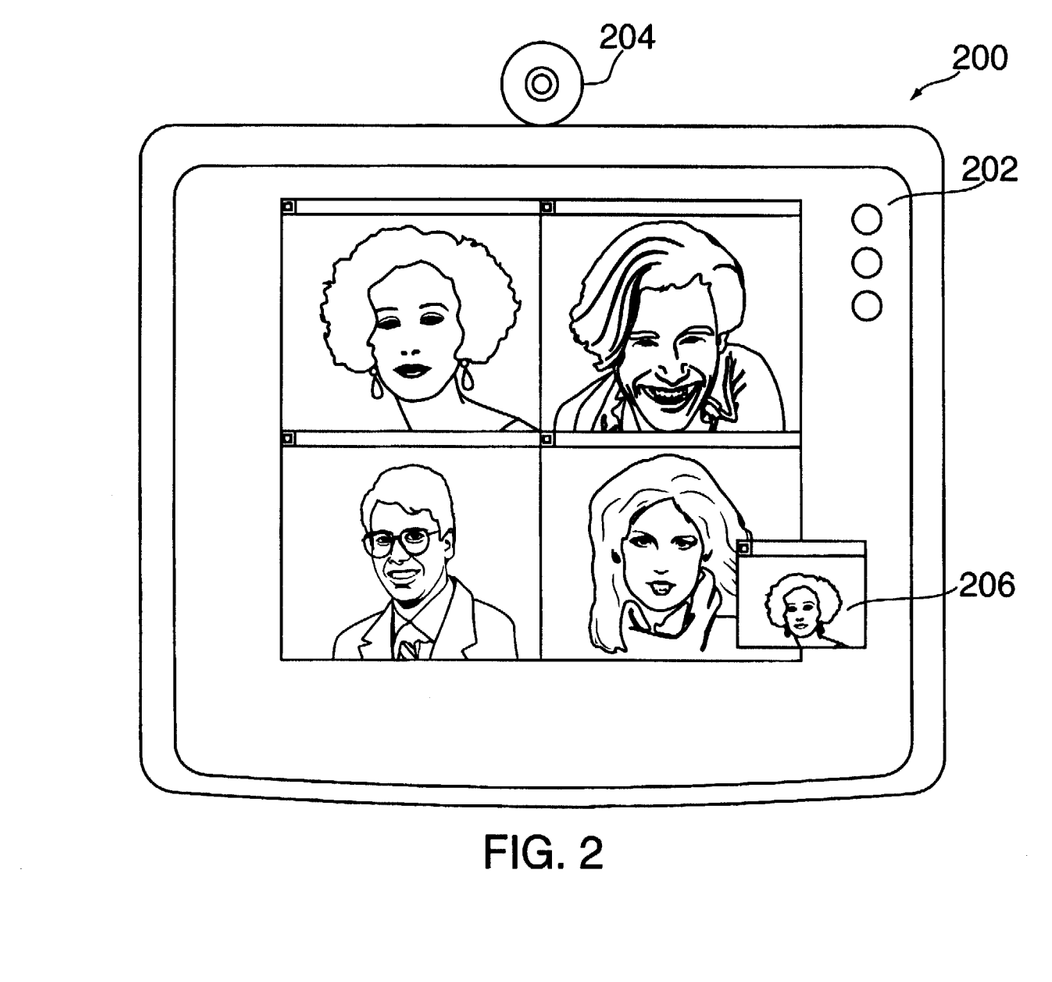
FIG. 2 shows a video conferencing screen display.

FIG. 2 shows display device 200 displaying screen display 202 which is a typical video conferencing display. Display device 200 can be, for example, PC 120 or TV 124 of FIG. 1. Screen display 202 shows four participants in a video conference already in progress in four windows. During the video conference only the four large windows are visible on the screen corresponding to one of each of the four video conference participants. The video conference participants correspond to the three phone instruments 104, 106 and 108 of FIG. 1, along with (optionally) the participant viewing display screen 202 whose image is captured by a camera 204 mounted atop display device 200. At some point during the ongoing video conference the caller at telephone instrument 110 of FIG. 1 places a call to receiving videophone 102 intending to speak with the video conferencing participant viewing display device 200 of FIG. 2.

The caller's act of placing such a call send Caller ID information to videophone 102. Videophone 102 includes standard circuitry for decoding the Caller ID information to determine the caller's telephone number, at a minimum, and possibly including the caller's name or other information. The decoded Caller ID information is used to index a database either in videophone 102, PC 120 or another external storage medium, to match up a predefined image with the caller's telephone number. The matched image is used to generate a small icon shown as icon 206 of FIG. 2 which is displayed on display screen 202. The viewer is thus provided with a visual cue as to the identity of the calling party. The icon may be displayed in place of an audible alert such as standard a telephone ring or machine-generated announcement of the calling number and name. Naturally, the name and telephone number of the caller may also be displayed in connection with the image icon 206. Also, additional image information, audio information, etc. can be provided.

Based on this information the viewer is able to make a decision as to accepting or ignoring the incoming call. Should the viewer wish to accept the incoming call the user can simply click within image icon 206. Should the user wish to reject the incoming call the user may click on the close button at the upper left of icon 206. The user may also simply ignore the incoming call and image icon 206 will disappear after a predetermined time. Typically, this predetermined time is 2–4 telephone rings after which a standard telephone service such as message answering, voice mail, etc. can take over the incoming call.

Figure 3:
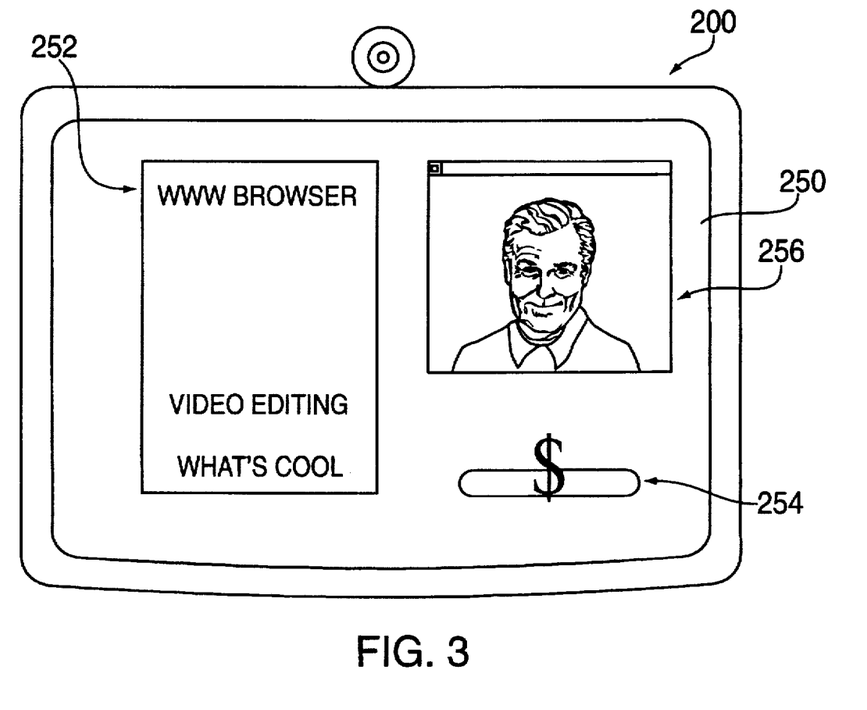
FIG. 3 shows a personal computer screen display.

FIG. 3 shows display device 200 with a second screen display 250. On screen display 250 are shown menu 252, banking icon 254 (used merely to illustrate additional icons that may be present) and image icon 256. Image icon 256 is similar to image icon 206 discussed above in connection with FIG. 2. Screen display 250 of FIG. 3 shows that the appearance and operation of the image icon of the present invention is essentially the same whether the image icon is being used in a video conferencing application or in a PC application. Image icon 256 appears when there is an incoming call whose Caller ID has been associated with the image shown in FIG. 3. The image is then displayed on display device 200 as shown. A user of the PC viewing the display device can click on image icon 256 to receive the incoming call. Alternatively,the viewer can click on the close button in the upper left-hand corner of image icon 256 to cause the icon to disappear. This could mean that the call will be handled by the viewer's voice mail or other service. Finally, the default peration (should the viewer not perform any action on image icon 256) is that the icon will disappear after a predetermined interval such as number of rings, time period, etc. In this case, the call can be handled by voice mail or another service.

Figure 4:
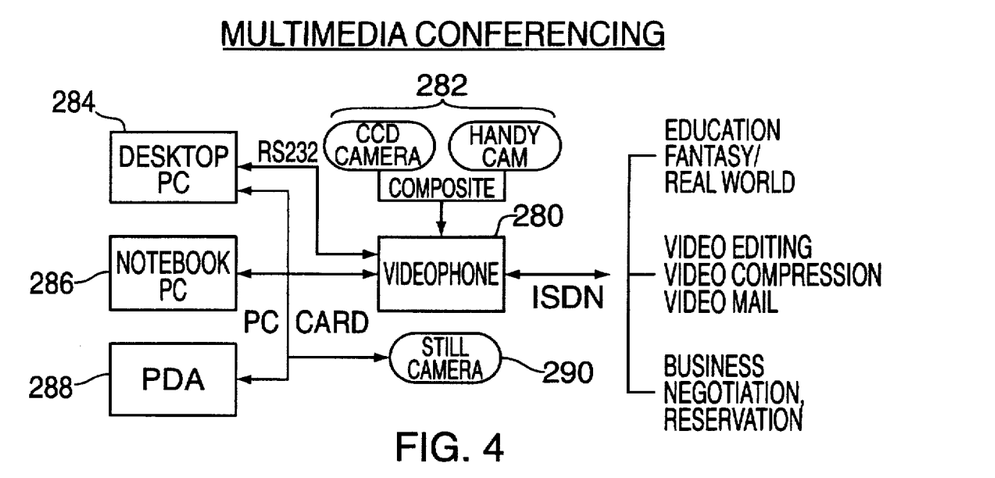
FIG. 4 shows an embodiment of the present invention in a multimedia conferencing environment.

FIG. 4 shows an embodiment of the present invention in a multimedia conferencing environment.

In FIG. 4 audio and image information, along with computer data or other types of data, are provided over ISDN lines to convey information such as education, video editing and business. Videophone 280 also receives composite video information from, e.g., external video cameras at 282. Videophone 280 transfers information to desktop PC 284, notebook PC 286 and personal digital assistant (PDA) 288. Still camera 290 transfers picture information to the desktop PC, notebook PC and PDA. Transfers to and from the PDA are via wireless communications.

The operation of the present invention in the multimedia conferencing environment shown in FIG. 4 is essentially the same as with the operation discussed above in connection with FIG. 1.

Figure 5:
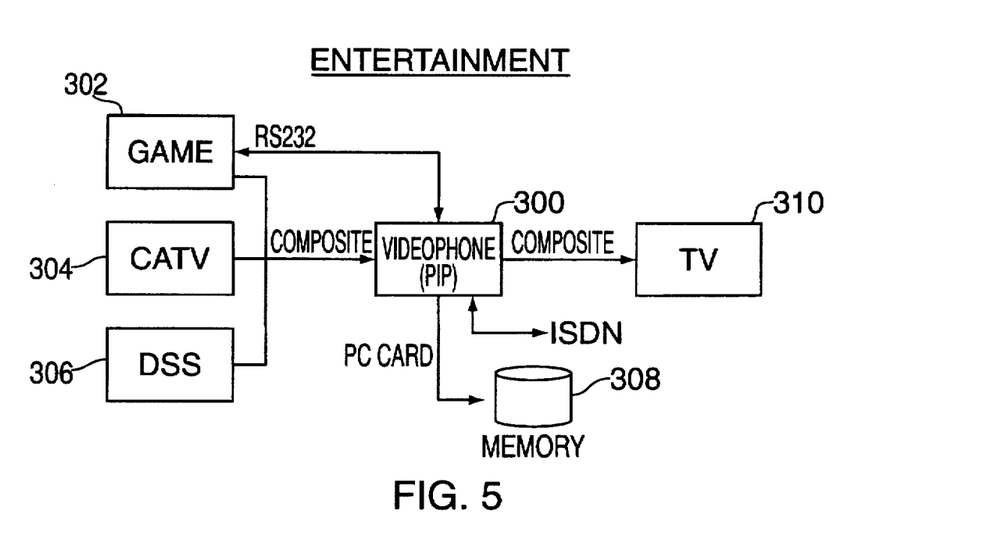
FIG. 5 shows an embodiment of the present invention as applied to an entertainment environment.

FIG. 5 shows an embodiment of the present invention as applied to an entertainment environment.

FIG. 5 shows videophone 300 connected to game system 302, cable TV system 304, memory 308 and TV 310. Additionally, direct satellite system is connected to game system 302. Videophone 300 is connected to the phone system over an ISDN line similar to the system of FIG. 4. The operation of the present invention in the entertainment environment shown in FIG. 5 is essentially the same as with the operation discussed above in connection with FIG. 1.

Figure 6:
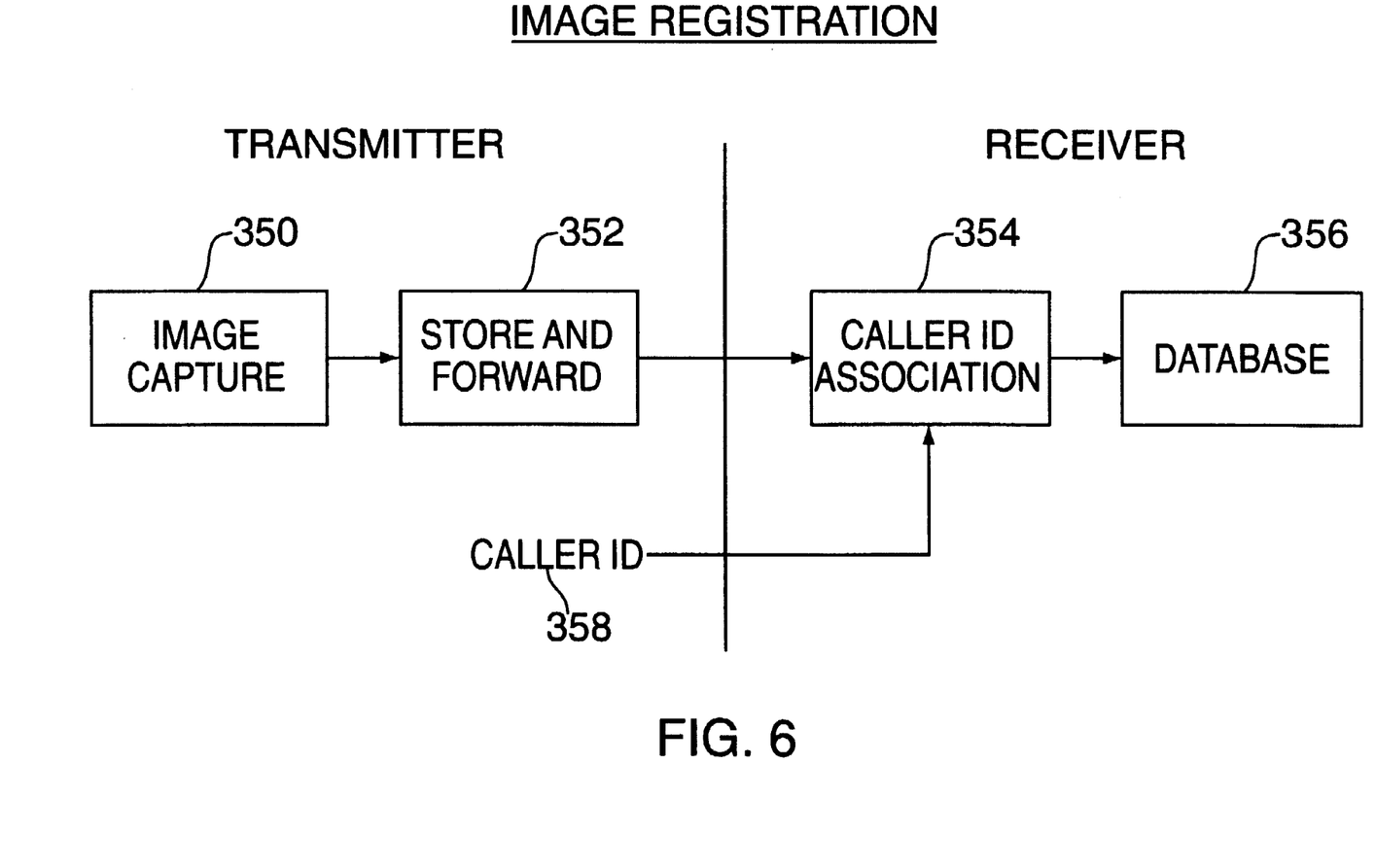
FIG. 6 illustrates the image registration procedure of the present invention.

FIG. 6 illustrates the image registration procedure of the present invention.

In FIG. 6, the operations of image capture 350 and store and forward 352 are performed at the transmitting end. That is, they are performed by components at the sending, or calling, party's end. The image capture can be by any of several different means. For example, a digital still camera can be used to capture an image of the caller, a logo a building or any desired image. Alternatively, a video camera, scan from a printed image, drawing from a paint program, etc. can be used to generate an image.

The store and forward step 352 can also be performed by several methods. The image can be transferred directly from a videophone, can be sent from a PC via a modem connection, can be posted to a resource or a network, such as to a directory on a disk drive, as a file on a bulletin board, etc., also the image can be transferred via a floppy disk or other storage medium. The image can be sent at the time of attempting to place a call to the receiver where the image can be sent at some prior time.

Step 354, that of Caller ID association, is performed at the receiving end. As shown in FIG. 6, a Caller ID 358 is transmitted by the transmitter when a call is being placed to the receiver. In this example the receiver is the telephone instrument being called. Where the store and forward step 352 is being performed concurrently with placing a call to the receiver the Caller ID will be transmitted to the receiver shortly before the transmitting of the image information. This allows step 354, Caller ID association, to be performed at the receiving end by merely associating the Caller ID with the image and storing the image, Caller ID identifier, and the association between the image and identifier, into database 356. In the case where the image is received long before or after Caller ID 358 is received, there must be an identifier provided with the image so that it can be matched up with the Caller ID at a later time. In any case, database 356 ultimately records the image, Caller ID and the association for later use.

Figure 7:
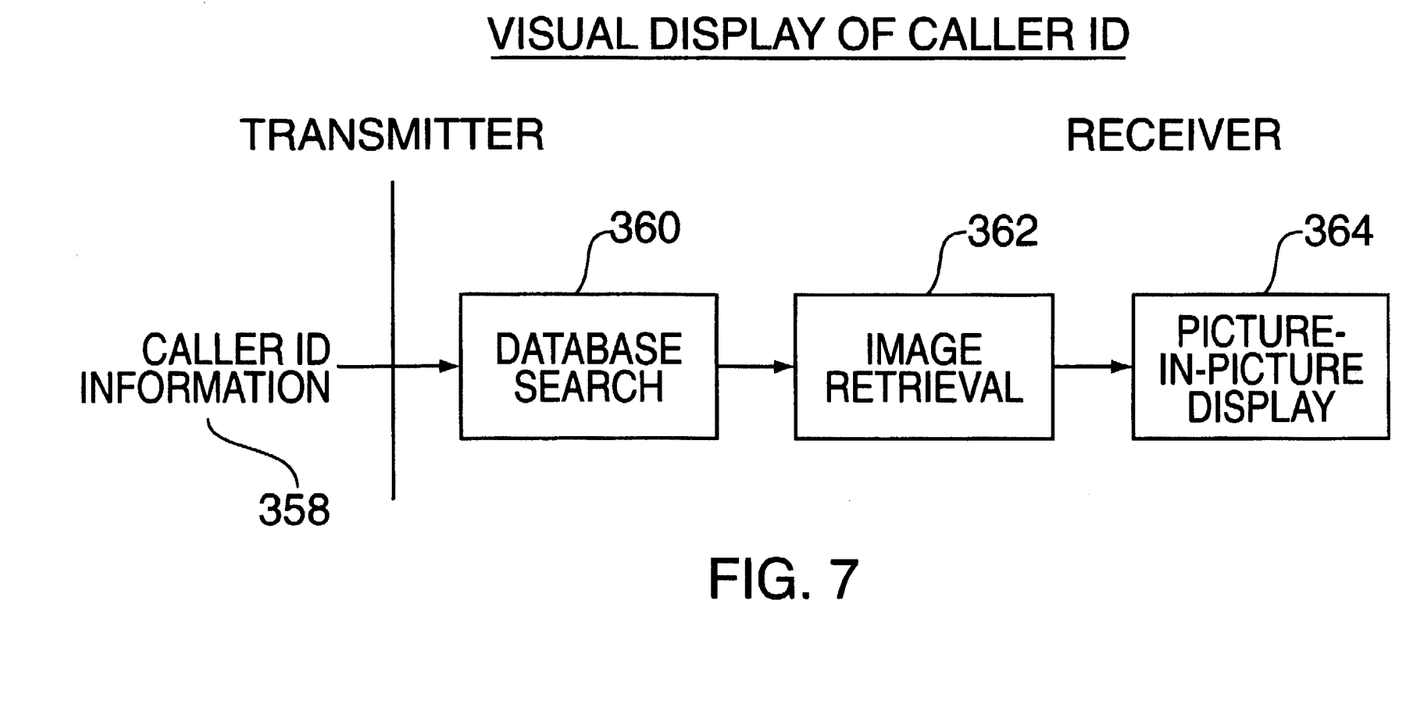
FIG. 7 illustrates a process for visual display of an image associated with a Caller ID.

This later use is shown in the "Visual Display of Caller ID" shown in FIG. 7. In FIG. 7, when the receiver receives Caller ID information 358 a database search step 360 is initiated. This causes the Caller ID information to index its associated image icon previously stored in the database as discussed above in connection with FIG. 6.

Once database search step 360 has been completed the image has been identified and it is retrieved at step 362. The received image is used as the image icon and, in the case of this example, is shown in a "picture in picture" display on, for example, a television set as illustrated by step 364.

Figure 8:
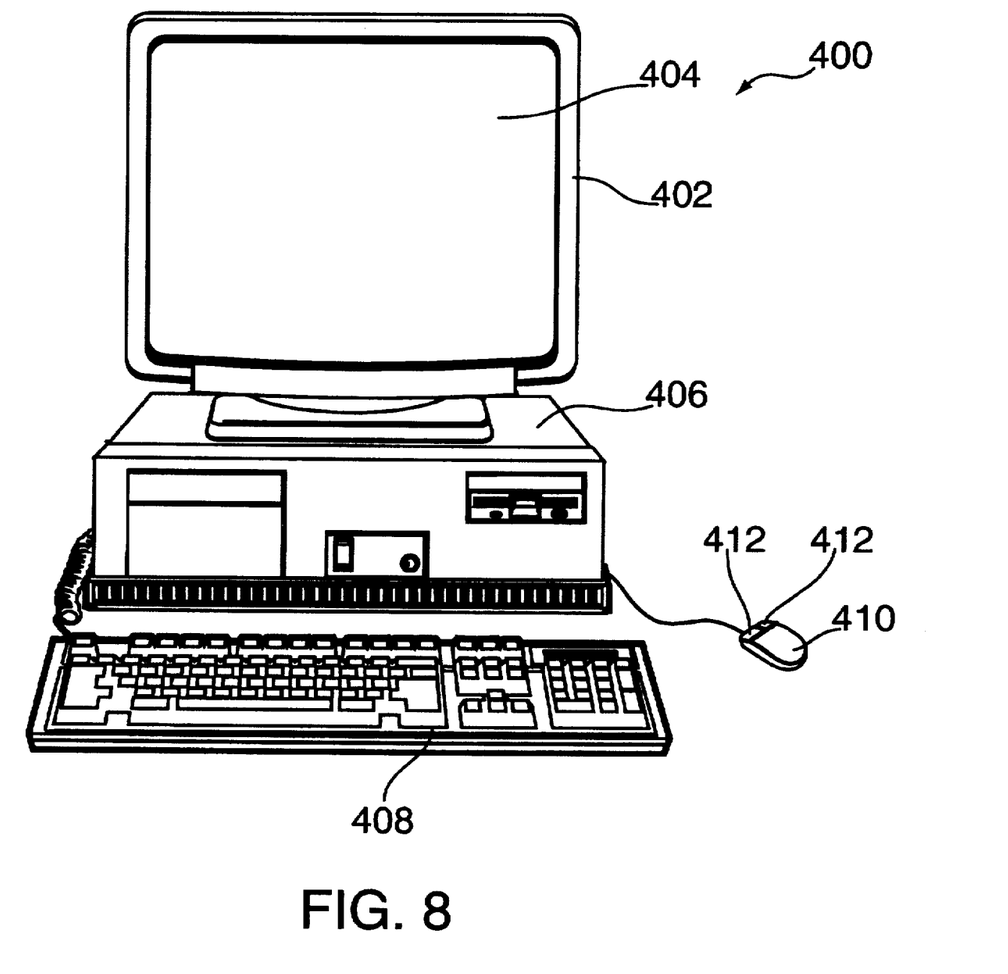
FIG. 8 illustrates basic components in a traditional personal computer.

The processing of the image icon in response to user input signals is performed by a processor in one of the components in any of the configurations shown in FIGS. 1, 4 or 5. Traditionally, a PC would house the processor and other devices such as display, disk drive, etc. However, these components can be located in other devices, such as a videophone, or can be external devices coupled to the system via a cable connection. Also, multiple processors may be employed. Assuming a traditional PC, the components for the PC are illustrated in FIG. 8 where computer system 400 includes display device 402, display screen 404, cabinet 406 and user input devices such as keyboard 408 and mouse 410. Mouse 410 includes buttons 412. Other user input devices are possible such as a trackball, touch screen, remote pointing device, data glove, etc.

Cabinet 406 can include standard computer components (not shown) such as a hard disk drive, CDROM drive, floppy disk drive, removable hard disk, various adapters and peripheral interfaces and more.

Figure 9:
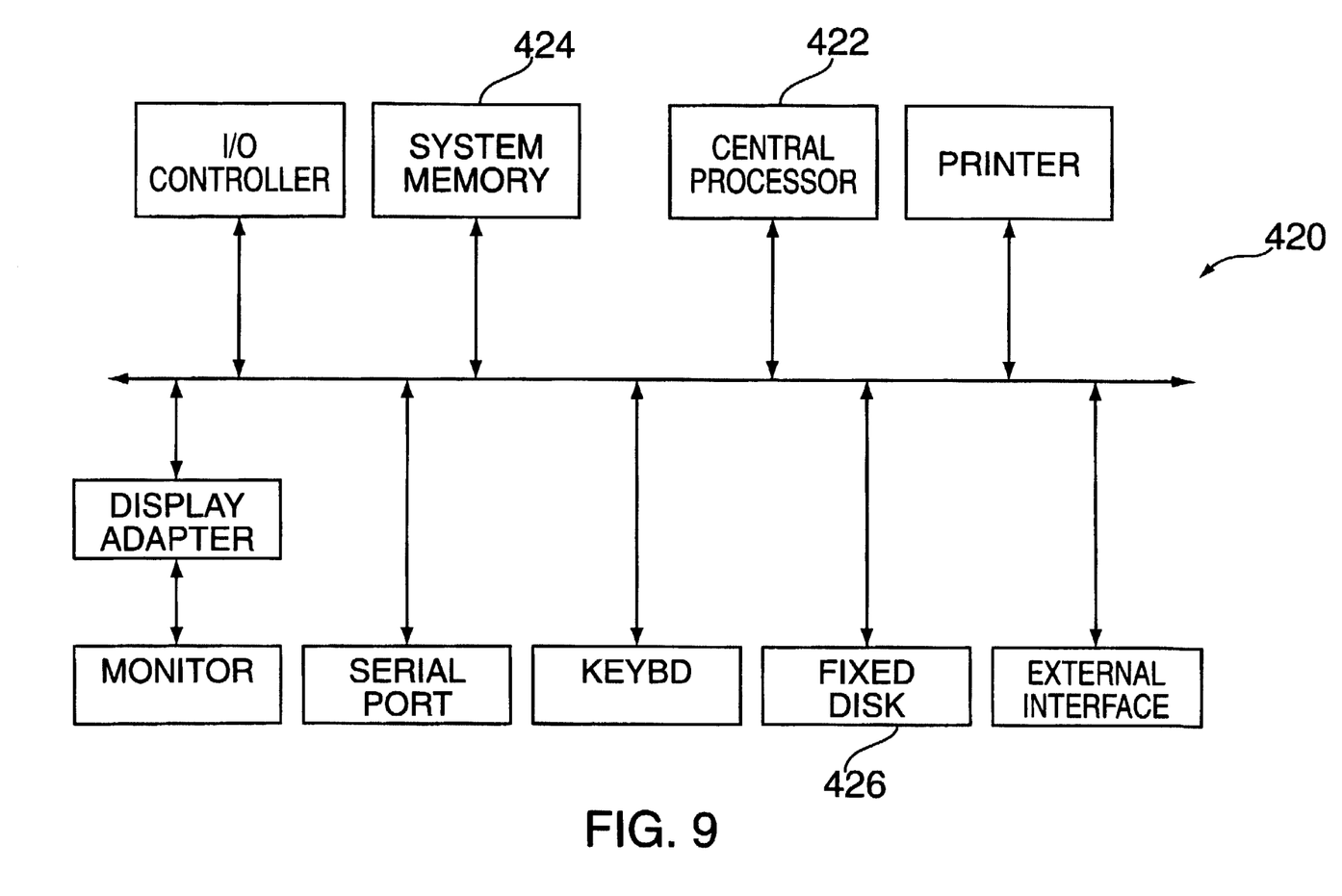
FIG. 9 shows basic subsystems in a traditional personal computer.

FIG. 9 illustrates some common subsystems within a traditional PC. In FIG. 9, bus 420 interconnects the various components in a known manner. For example, processor 422 obtains data and program code from system memory 424 and fixed disk 426 to perform functions and manipulate data.

Many other configurations of computer components and subsystems can be used. As mentioned, the components and subsystems can be distributed (and replicated) throughout systems such as those shown in FIGS. 1, 4 and 5. Many different system configurations are suitable for use with the present invention. The steps of accepting user input, detecting that the user has clicked within the image icon or on the close box in the image icon window, and responding to the user's input or performing a time out where the user ignores the image icon are all performed by a processor such as a processor that would reside in a PC, videophone, TV (if so equipped), etc.

Other refinements to the display and processing of the image icon are possible. For example, the image icon can change in color or intensity to indicate that a ringing of the receiving telephone is occurring. Additional information in the form of images, text, numbers, etc. can be provided along with the display of the image icon. For example, a box or additional icon can be provided which the user can select to pull up more information on the caller. This additional information can be entered by the user in the system that allows annotation of the image icon with additional text or other information. Also, the image icon need not be a single static picture but can be a sequence of pictures or a video to show animation within the image icon window. Other modifications are possible.

As mentioned, the image icon need not be a face of a caller. In some cases, it is difficult to have just one face to associate with a given phone number. For example, where a family shares a single telephone the image icon might include all of the family members in the image. Also, where a number is associated with a company the company's logo, an image of the outside of the company's building, etc., can be used. Where no image has previously been associated with a Caller ID associated with an incoming number a default image such as a question mark can be used.

Modifications to the foregoing disclosure will be apparent to one of skill in the art. Accordingly, the embodiments set forth in the text and Figures of this specification and claims are to be regarded as merely illustrative of but one embodiment, the scope of the invention to be determined solely by the appended claims.

I claim:

1. For use in a system including a telephone receiver, a display device, a processor, a storage device, and a user input device, a method for displaying an image in association with a Caller ID identifier, the method comprising the steps of:

storing a facial image of a future caller in a storage medium;

storing an association which indicates that a predetermined Caller ID identifier and the stored facial image are associated;

using the telephone receiver to receive an incoming call and a corresponding incoming Caller ID identifier;

using the processor to determine whether the incoming Caller ID identifier matches the predetermined Caller ID identifier;

using the processor to display the facial image on the display device when it is determined that the incoming Caller ID identifier matches the predetermined Caller ID identifier;

waiting for an acceptance of the incoming call that is provided from the user input device; and automatically causing an effectively permanent disappearance of the facial image from display when the incoming call is not accepted within a predetermined period.

2. The method of claim 1, wherein a calling telephone is used to place the incoming call to the telephone receiver, the method further comprising the step of transmitting the image from the calling telephone to the telephone receiver concurrently with the incoming call.

3. The method of claim 1, wherein the step of using the processor to display the image on the display device includes the substep of:

displaying the image within a window on the display device;

displaying a close box corresponding to the window;

accepting selection signals from the user input device to indicate that the close box has been activated; and stopping the displaying of the image in response to the selection signals.

4. The method of claim 1, wherein the step of using the processor to display the image on the display device includes the substeps of: displaying the image within a window on the display device;

accepting selection signals from the user input device to indicate that the user has selected the window; and accepting the incoming call in response to the selection signals.

5. The method of claim 1, wherein the telephone receiver comprises a video conferencing system.

6. The method of claim 1, wherein the display device is a computer monitor.

7. The method of claim 1, wherein the display device is a television screen.

8. An apparatus for displaying an image in association with a Caller ID identifier, the apparatus comprising:

a telephone receiver;

a video display device coupled to the telephone receiver;

a storage device for storing a facial image;

a user input device; means for associating a Caller ID identifier with the image stored in the storage device;

means for reading out the stored image and displaying the read out image on the display device when the Caller ID is transmitted to the telephone receiver in connection with an incoming call;

means for accepting signals from the user input device to accept the incoming call; and means for automatically causing an effectively permanent disappearance of the image from display on the display device when the incoming call is not accepted within a predetermined period.

9. The method of claim 1, wherein the disappearance of the facial image when the incoming call is not accepted within a predetermined period occurs notwithstanding the receipt from the input device of input that is unrelated to the acceptance of the incoming call.

10. The apparatus of claim 8, wherein the disappearance of the facial image when the incoming call is not accepted within a predetermined period occurs notwithstanding the receipt from the input device of input that is unrelated to the acceptance of the incoming call.

* * * * *